(12) United States Patent
Nelson

(10) Patent No.: US 7,215,541 B2
(45) Date of Patent: May 8, 2007

(54) MULTI-STAGE LOW NOISE INTEGRATED OBJECT AND SYSTEM COOLING SOLUTION

(75) Inventor: Daryl J. Nelson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 10/617,540

(22) Filed: Jul. 11, 2003

(65) Prior Publication Data
US 2005/0006085 A1 Jan. 13, 2005

(51) Int. Cl.
*H05K 7/16* (2006.01)
(52) U.S. Cl. ...................... 361/690; 361/701
(58) Field of Classification Search ........ 361/687–697, 361/709–710, 701–703
See application file for complete search history.

(56) References Cited
U.S. PATENT DOCUMENTS 5,926,370 A * 7/1999 Cromwell .................. 361/700
6,191,546 B1 * 2/2001 Bausch et al. .............. 318/471
6,766,817 B2   7/2004 da Silva
7,111,667 B2 * 9/2006 Chang ....................... 165/80.3

FOREIGN PATENT DOCUMENTS

EP     0 860874     8/1998

* cited by examiner

*Primary Examiner*—Yean-Hsi Chang
(74) *Attorney, Agent, or Firm*—Robert D. Anderson

(57) ABSTRACT

A method and system are described for multi-stage cooling of a system, such as a computer system, and a high thermal dissipating object, such as a CPU, to minimize acoustic noise generated by the cooling system. The method includes causing at least one fan in a system to operate at high speeds during a first stage, and reducing the speed of at least one fan during an intermediary stage. The system includes a high thermal dissipating object, a heat sink connected to the high thermal dissipating object, a first fan to direct airflow on a main section of a heat sink during a first stage, and a second fan to direct airflow on an extended section of the heat sink. Optionally, a final stage may be entered into where all fans are shut off.

7 Claims, 7 Drawing Sheets

MULTI-STAGE LOW NOISE INTEGRATED OBJECT AND SYSTEM COOLING SOLUTION

FIELD

Embodiments of this invention relate to the field of thermodynamics and acoustics, and more specifically, to a low noise cooling system for cooling high thermal dissipating objects and systems.

BACKGROUND

The development and management of effective thermal solutions becomes increasingly important as the performance thresholds of CPU's (central processing units) rise. The objective of thermal management is to ensure that the temperature of each component in a system is maintained within specified functional limits. The functional temperature limit is the range within which electrical circuits can be expected to meet their specified performance requirements. Operation outside the functional limit can degrade system performance and cause reliability problems.

Furthermore, case temperatures within a specified range should also be maintained. The case temperature is the surface temperature of the package at its hottest point, typically at the geographical center of the chip. Temperatures exceeding the case temperature limit over a length of time can cause physical destruction or may result in irreversible changes in operating characteristics.

From an acoustics standpoint, there is a strong desire to migrate the PC (personal computer) into quiet home environments, particularly important in areas that have tight living conditions, such as in China & Japan. As manufacturing processes improve to decrease die area and increase heat fluxes, there is a corresponding need for higher performance air-cooling heat sinks. While the solution trend is to increase the efficiency of the fan, RPM (rotations per minute) of the fan, heat sink surface area, and/or volume airflow through the heat sink, these trends all result in increased acoustic noise from the fan.

To address the thermal issues, combinations of heat sinks and fans may be used to cool the CPU and the system. Today's fans that are used to cool CPU's and systems can only slow down to approximately ⅓ of their nominal full speed through the use of pulse width modulation fan speed control. Some fans can only be slowed down to ½ speed. Unfortunately, the nominal noise at full speed is so high that even when the speed is reduced to ½ or ⅓ full speed, the resulting acoustic noise is still too high for quiet environments. A current thermal solution uses a single fan that impinges high-speed air directly on the CPU heat sink. However, this concentrated cooling results in high acoustic noise.

High performance processors dissipate such large amounts of power that they must additionally dissipate heat through the use of extended surfaces such as heat sinks to maintain their reliability. However, even the use of heat sinks does not alleviate the need for the use of fans, and therefore does not contribute to resolving the acoustic problem associated with the use of fans.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In one aspect of embodiments of the invention is a system having multi-stage cooling. The system comprises a high thermal dissipating object in contact with a heat sink having a first section closest to the object, and a second section that is an extension of the first section and farthest from the object; a first fan to direct airflow onto the first section of the heat sink; a second fan to direct airflow onto the second section of the heat sink; a first sensor to measure temperature of the high thermal dissipating object; a second sensor to measure air temperature of the system; and a memory to store a computer program that detects conditions under which the first and second fans operate, and which cause the first and second fans to operate in accordance with environmental conditions.

In yet another aspect of embodiments of the invention is a multi-stage process for cooling a high thermal dissipating object. The process comprises causing at least one of the first fan and the second fan to operate at a first speed during a first stage; and causing at least one of the first and second fans to reduce speed during an intermediary stage.

Embodiments of the present invention include various operations, which will be described below. The operations associated with embodiments of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, embodiments of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Figure 1:
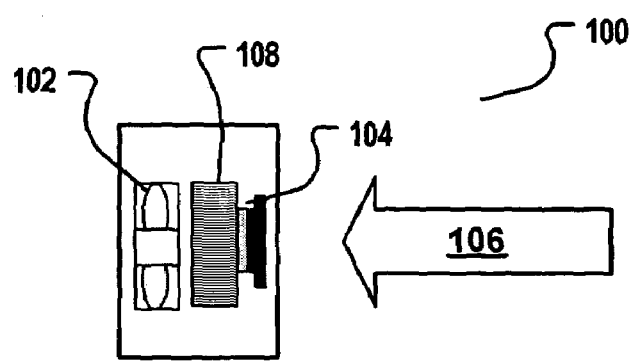
FIG. 1 is a block diagram illustrating a prior art impinging active heat sink cooling system comprising at least one fan and a heat sink.

Under the current state of the art, as illustrated in the system 100 of FIG. 1, where a high thermal dissipating object 104 lies below, and in contact with heat sink 108, heat is dissipated in a single stage 106 process that includes enabling at least one fan 102 in the system 100 to direct airflow onto the heat sink 108. Typically, this type of fan 102 is called an impinging fan, where the fan impinges air in the direction of the high thermal dissipating object 104, and directly on the heat sink 108. In this example, the fan 102 dissipates heat from the high thermal dissipating object 104 by impinging high velocity air directly on heat sink 108. The air from this fan 102 can secondarily cool surrounding components, but is primarily meant to cool the high thermal dissipating object 104. This approach is considered an impinging heat sink solution. To improve heat dissipation, the fan speed is increased, resulting in increased fan speed measured in revolutions per minute (RPM) of the fan. The concentrated cooling results in high acoustic noise.

Figure 2:
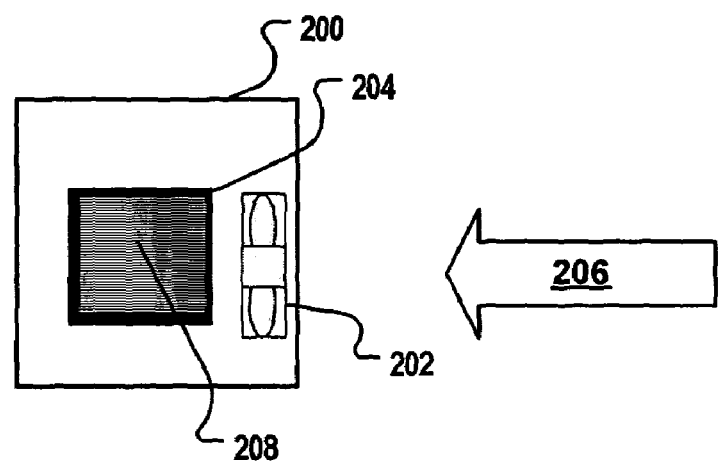
FIG. 2 is a block diagram illustrating a prior art passive heat sink cooling system comprising at least one fan and a heat sink.

FIG. 2 is another example illustrating a system 200 under the current state of the art. In this example, the high thermal dissipating object 204 lies below, and is in contact with the heat sink 208. In a single stage process 206, fan 202 directs airflow through the heat sink 208, as opposed to impinging down on the heat sink 108 in the direction of the high thermal dissipating object 204. This type of fan is typically known as a system fan, where the fan directs airflow generally into the system, not onto any particular object. This approach is also primarily targeted at cooling just the object 204, and is considered a passive solution.

Trends to improve this process include increasing the RPM of the fan, increasing the heat sink surface area, and/or increasing the volume airflow through the heat sink. However, since these approaches are targeted at cooling the high thermal dissipating object, they do not improve the overall system cooling. Furthermore, they tend to increase acoustic noise from the fans.

In embodiments of the invention, multiple fans operate dependently of each other in various stages of object and system cooling. Generally, when a high thermal dissipating object, such as a CPU, dissipates full thermal design power (TDP), and/or operates in elevated temperature environments, at least one fan is operative. In described embodiments, two fans are operative. As the environmental conditions improve, and the temperature drops, or as the high thermal dissipating object runs at a lower power, at least one fan shuts off, depending on the object and system level cooling requirements, thus significantly reducing acoustic noise from the fans. In a final stage of cooling, all fans shut off, allowing natural convection cooling to take place.

As used herein, a high thermal dissipating object comprises an object that is capable of dissipating large amounts of heat that needs to be removed from the object and surrounding components in order to maintain or improve reliability requirements. Furthermore, a system, as used herein, shall describe an assembly in which a high thermal dissipating object resides. An example of a high thermal dissipating object, as described in embodiments below, is a CPU, and an example of a system is a computer chassis in which the CPU is housed.

System

Figure 3:
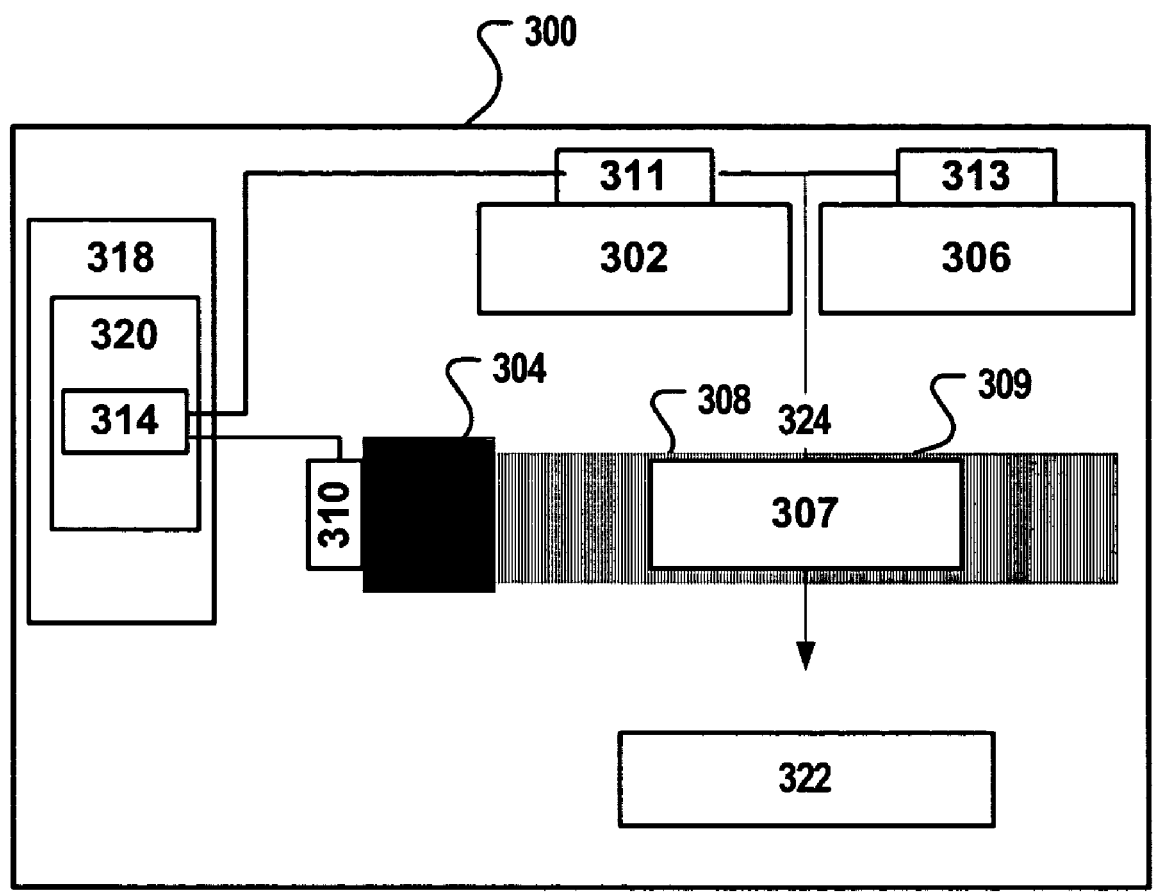
FIG. 3 is black box diagram illustrating a system in accordance with general embodiments of the invention.

FIG. 3 is a relationship diagram illustrating a system 300 in accordance with general embodiments of the invention. The system 300 comprises a first fan 302; a second fan 306; a high thermal dissipating object 304; and a heat sink 307 having a first section 308, and a second section 309. The first section 308 is the main section, which is closest to the high thermal dissipating object 304, and the second section is the extended section, which farthest from the high thermal dissipating object 304.

The first fan 302 cools high thermal dissipating object 304 by directing airflow (direction of airflow indicated by reference numeral 324) onto main section 308 of the heat sink 307. The second fan 306 cools high thermal dissipating object 304 as well as system 300 by directing airflow onto extended section 309 of the heat sink 307. In some embodiments, first fan 302 may be a primary fan, and the second fan 306 may be a secondary fan.

The system may additionally comprise a first sensor 310 to monitor the temperature of the high thermal dissipating object 304, and at least one second sensor 311, 313 (two shown) to monitor the air temperature of the system 300. As illustrated in FIG. 3, first sensor 310 is communicatively coupled to high thermal dissipating object 304, and second temperature sensors 311, 313 are communicatively coupled to the system 300 in close proximity to the fans 302, 306 in order to provide temperature data to fan speed control feature 314 of computer program 320 located in memory 318 of the system 300. Fan speed control features 314 vary the speed of the first 302 and second fans 306 in response to temperatures sensors 311, 313, as well as temperature sensor 310.

Temperature Sensors

First sensor 310 is typically a diode sensor in the CPU circuitry, or equivalent circuit. This sensor directly measures the temperature of the primary circuit being monitored, such as the CPU. Second sensors 311, 313 are typically air temperature sensors, such as thermisters. These sensors measure air temperatures at strategic locations of concern within the system, such as air temperatures into the fans. All sensors 310, 311, 313 relay temperature data to program 320 residing on system memory 318, and fan speed control features 314 transition system 300 through stages of cooling by controlling the fan speeds in order to prevent over-temperature of critical components within the system, such as the CPU, and other electronic components 322.

Heat Sink

A heat sink is an element that aids in the transfer of heat away from a high thermal dissipating object. A heat sink may be made of an element that is conductive to heat such as aluminum or copper. As the high thermal dissipating object increases in temperature, heat is transferred from the high thermal dissipating object to the heat sink. In described embodiments, heat is transferred from the high thermal dissipating object to a main section of the heat sink, and then to the extended section of the heat sink. In a computer system, for example, a heat sink 308 is a device that is attached to a CPU, for example, to keep the CPU from overheating by absorbing its heat and dissipating it into the air.

Fins: Heat sinks 308 are typically aluminum and may have fins that extend from the base. Fins extend the areas of the heat sink to allow more contact area for cooling air. Fins allow air to flow through the heat sink to enable more heat to be removed from the heat sink. Depending on fin spacing and geometry, the fins can cool in natural convection mode, driven by the buoyancy effects of air as it heats with respect to gravity; or through forced air cooling, such as the case of fans blowing cool air through the heated fin surface areas. The fins can be made of aluminum or copper, for example, and/or may be enhanced with graphite fibers. Heat can be spread between fins through soil base materials such as copper, but can be enhanced through the use of heat pipes or liquid cooling.

Connectivity: Heat sink sections 308, 309 may be connected with high heat conductivity material, such as copper or graphite composites; or cooling pipes (via liquid cooling or heat pipes), as just a few examples, some of which are discussed below.

A cooling pipe is a component which aids in removing heat away from the heat sink. A cooling pipe may comprise liquid cooling or a heat pipe, for example. In a heat sink comprising one or more liquid cooling tubes, a coolant (such as water) is run through the water tubes. As the coolant passes through the tubes, the tubes decrease in temperature, and allow heat from the high thermal dissipating object to spread to the fins of the heat sink. The liquid cooling tubes may also be made of a conductive material like aluminum or copper, or enhanced with graphite fibers.

A heat pipe is a device that can transfer heat from one point to another. Often referred to as a superconductor, a heat pipe possesses extraordinary heat transfer capacity and rate with almost no heat loss. A heat pipe is made of an aluminum or copper container, and the container comprises inner surfaces having a capillary wicking material. Heat pipes utilize phase change within a closed container, where heat is vaporized at the evaporator section near the high thermal dissipating object, and condensed in the condenser section near the cooling fins. Liquid within the heat pipe then returns to the evaporator section through gravity assist, or more typically, via a wick material.

In described embodiments of the invention, as the high thermal dissipating object increases in temperature, heat is transferred from the high thermal dissipating object to the main section of the heat sink, and then to the extended section of the heat sink through heat pipes. Embodiments of the invention, however, are not limited to the use of heat pipes. For example, liquid cooling could be used instead.

Computer Program

As one of ordinary skill in the art would understand, methods described herein may be executed by a computer program. For example, Heceta 6 or equivalent, is an example of a program that is used in conjunction with the sensors 310, 311, 313 to trigger various stages of temperature control through variable speed fans. In this case, pulse width modulation (PWM) can be used to power the fans below 50% of full speed, typically down to ⅓ speed. The various stages are described below.

First Stage: A first stage of system cooling comprises a first set of conditions, and may be triggered by the occurrence of one or more conditions in that set. For example, the first stage may be triggered under the condition that the high thermal dissipating object reaches a given temperature under which it may sustain damage, or may compromise the reliability of the high thermal dissipating object and/or system. The first stage may also be triggered under the condition that the environment surrounding the high thermal dissipating object (i.e., system chassis) reaches elevated temperatures. Of course, these conditions are illustrative, and are not intended to be an exhaustive list of all the conditions under which the first stage may be entered.

For example, a CPU should sustain temperatures below the maximum specified junction or case temperature for the part, and the system chassis should remain at temperatures of the 35° C. to 55° C. range, depending on the components used in the system, and the maximum allowable exterior temperature, typically 35° C.

During the first stage, one or more fans operate at high speeds to transition object and system temperatures below specified temperatures, or within specified temperature ranges. The fans may operate at the same or at different speeds. During the first stage, fans may begin operating simultaneously, in succession, or both, depending on the number of fans, and the conditions in the system. No fans are shut off during the first stage.

During the first stage, in one embodiment of the invention, both the first fan and second fan operate at high speeds (for example, full speed) to quickly dissipate the heat from the high thermal dissipating object. In another embodiment of the invention, the first fan may operate at a high speed for a period of time, and then the second fan kicks in, and operates in parallel with the impinging fan. First and second fans may operate at the same or different speeds.

As one of ordinary skill in the art would understand, there may be more fans that may operate in parallel with currently operating fans during the first stage, whether the operation of the fans is operated in succession to the other fans, or simultaneously with the other fans.

Intermediary stage: The intermediary stage of the system cooling method comprises a second set of conditions, and may kick in under the condition that the environmental conditions of the system improve, when the temperature of the high thermal dissipating object drops, or when the high thermal dissipating objects runs at a lower power, for instance. Thus, when improved conditions are detected, computer program transitions the system from the first stage into an intermediary stage. Of course, these conditions are illustrative, and are not intended to be an exhaustive list of all the conditions under which the intermediary stage may be entered.

During this stage, at least one operating fan reduces its speed relative to another operating fan. In the example described above, for instance, the first fan completely shuts off during this intermediary stage while the second fan continues to operate. Additionally, the second fan may reduce its speed. It is also possible for one fan to reduce its speed (partially or shut off), and for another fan to begin operating during this stage.

Final Stage: Optionally, the cooling system may enter a final stage in which all fans shut off, allowing natural convection from heat sink 307 to take place. This stage is entered when the conditions are good enough to allow shutting off all fans. For example, this stage may be entered into in various sleep states.

While the stage in which natural convection occurs has been labeled the "final stage" herein, it should be understood that one or more fans may subsequently become operative again in an iterative method as described above.

First Embodiment

Figure 4:
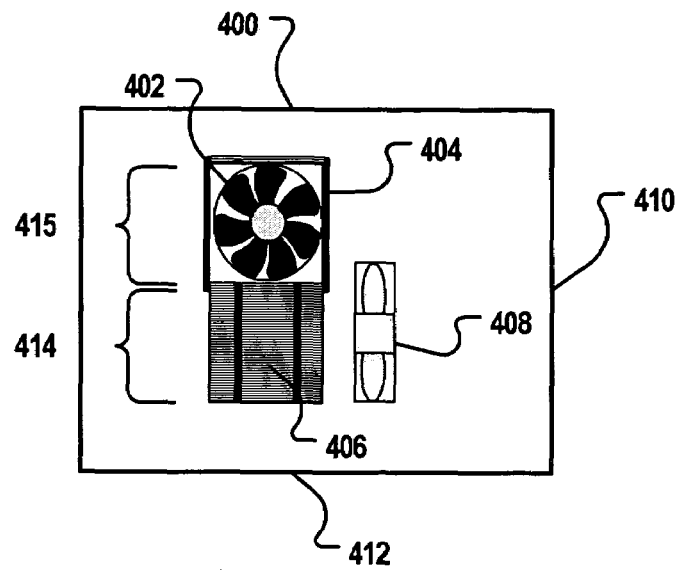
FIG. 4 is a first perspective view illustrating a system in accordance with a first embodiment of the invention.

FIG. 4 is a perspective view of a simplified computer system 400 in accordance with a first embodiment of the invention, where the first fan 402 is an impinging fan, and the second fan 408 is a system fan. The perspective shown is that of a computer system from the top. The system 400 comprises an impinging fan 402 to direct airflow to a main section (beneath fan, not shown) of a heat sink 406 that is in contact with a high thermal dissipating object 404 (below the fan); and a system fan 408 to direct airflow on an extended section 414 of the heat sink 406, where the system fan 408 is not coplanar with the impinging fan 402.

As shown in FIG. 4, for example, the planes on which the fans lie are perpendicular to one another, where each plane may be defined by the flat sides of the blades. As one of ordinary skill in the art would understand, the invention is not limited by this particular feature.

Figure 12:
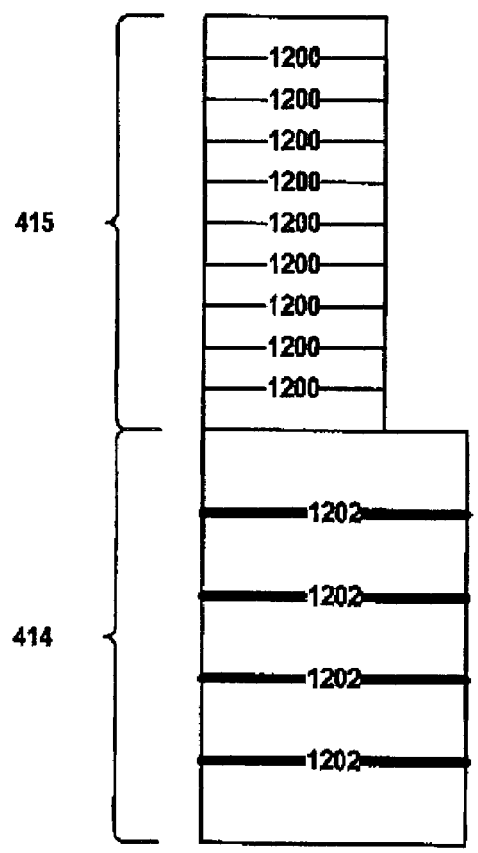
FIG. 12 illustrates a top view of a heat sink having fins in the main section that are twice the size, and approximately twice the spacing as those in the extended section.

Further to this embodiment of the invention, as illustrated in FIG. 12, fins 1200 on main section 415 are denser (i.e., closer together) than fins 1202 on extended section 414, but shorter than the fins 1202 on the extended section 414. For example, the fins 1202 on the extended section 414 may be approximately twice the spacing as the fins on the main section 415. The actual fin geometry in the extended section 414 is larger than those of the main section 415 to make up for the wider fin spacing. In this embodiment, the size of the fins 1202 in the extended section 414 is approximately twice the size of the fins 1200 in the main section 415 (larger size depicted by boldface lines).

In this embodiment, the impinging fan 402 serves to dissipate heat from the dense fins on the main section 415, and the system fan 408 allows higher volume airflow through the extended section 414 of the heat sink 406, as well as a lower pressure drop. This results in relatively equal heat transfer from the two heat sink sections 414, 415, but higher volume airflow for system cooling beyond the heat sink section 414.

Figure 5:
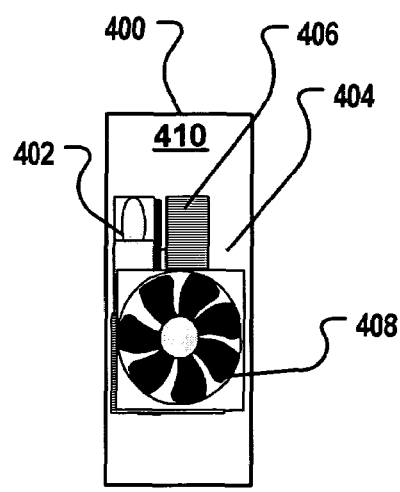
FIG. 5 is a second perspective view of the system of FIG. 4.
Figure 6:
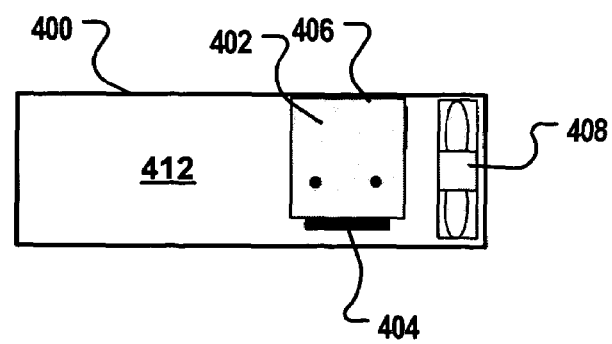
FIG. 6 is a third perspective view of the system of FIG. 4.

FIGS. 5 and 6 are orthogonal views of FIG. 4. Reference numeral 410 depicts perspective view illustrated in FIG. 5, and reference numeral 412 depicts perspective view illustrated in FIG. 6.

Second Embodiment

Figure 7:
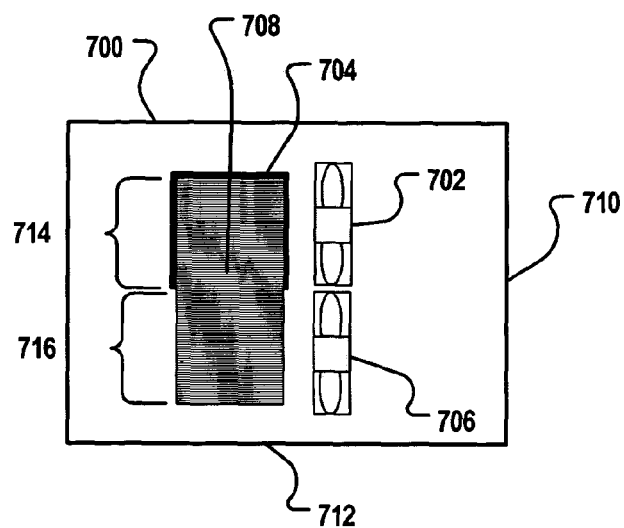
FIG. 7 is a first perspective view illustrating a system in accordance with a second embodiment of the invention.

FIG. 7 is a perspective view of a simplified computer system 700 in accordance with a second embodiment of the invention, where both first and second fans are system fans. The system 700 comprises a first system fan 702 to direct airflow on a main section 714 of the heat sink 708 that is in contact with a high thermal dissipating object 704 (under the heat sink 708); and a second system fan 706 to direct airflow on the extended section 716 of the heat sink 708, where the system fan 706 is coplanar with the impinging fan 702.

Figure 13:
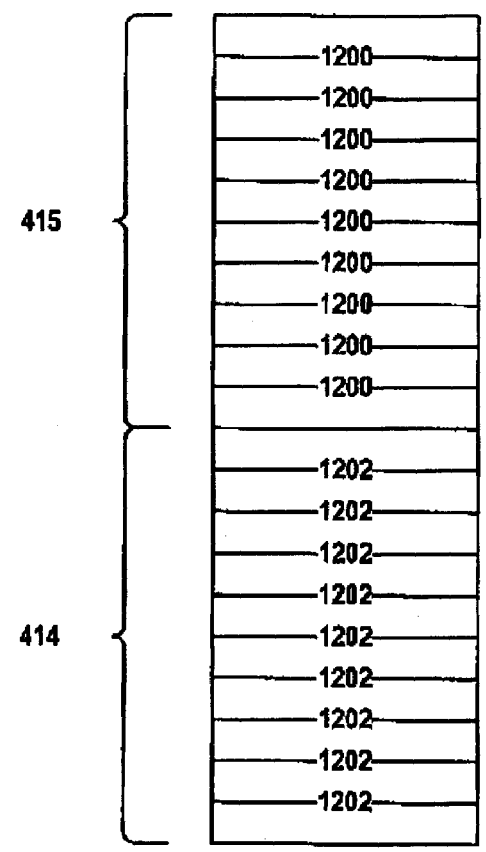
FIG. 13 illustrates a top view of a heat sink having fins that are sized and spaced apart equally between the main section and the extended section.

As shown in FIG. 7, for example, the fans lie on the same plane, where each plane may be defined by the flat sides of the blades. However, as one of ordinary skill in the art would understand, the invention is not limited by this particular feature. Further to this embodiment of the invention, as illustrated in FIG. 13, fin size and fin spacing on the main 714 and extended sections 716 is approximately the same, and both system fans blow through both sections, rather than impinge on one of them. For example, the fin spacing and size can be the fin spacing and size as described in the first embodiment. The pressure drop through these fins is minimized for maximum cooling of the remainder of the system.

Figures 8, 9:
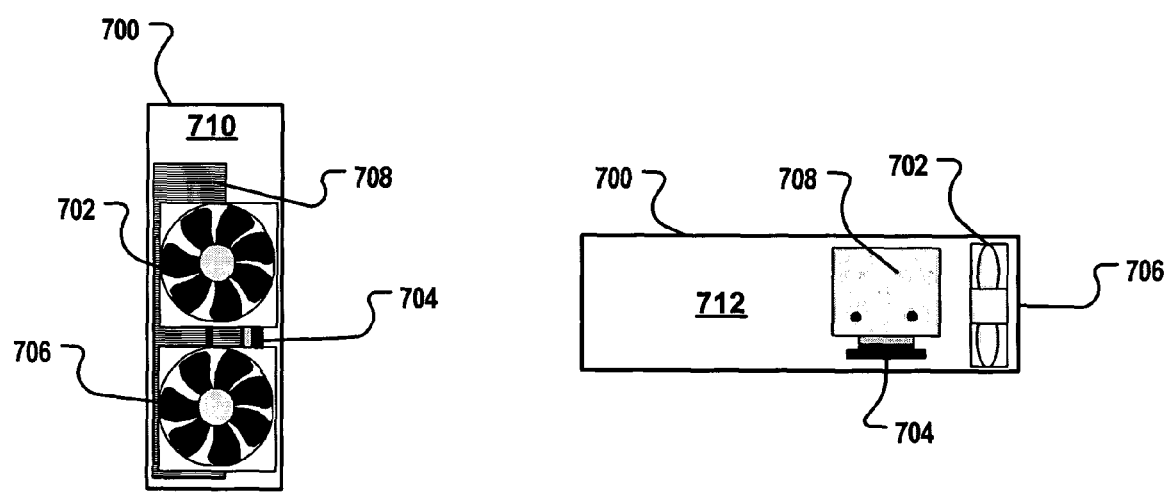
FIG. 8 is a second perspective view of the system of FIG. 7.
FIG. 9 is a third perspective view of the system of FIG. 7.

FIGS. 8 and 9 are orthogonal views of FIG. 7. Reference numeral 710 depicts perspective view illustrated in FIG. 8, and reference numeral 712 depicts perspective view illustrated in FIG. 9.

In both embodiments, both fans 402, 408, 702, 706 simultaneously cool the high thermal dissipating object 404, 704, as well as the system. Both fans 402, 408, 702, 706 can intake air directly from the exterior of the chassis to minimize pre-heating of air before impingement on the heat sink 406, 708. As one of ordinary skill in the art would understand, the exact geometry of the heat sink 406, 708 is not limited to that shown in the figures. For example, it is possible to further extend the heat sink 406, 708, add bends to the general shape along its length, or add additional fans of varying sizes.

Methods

Figure 10:
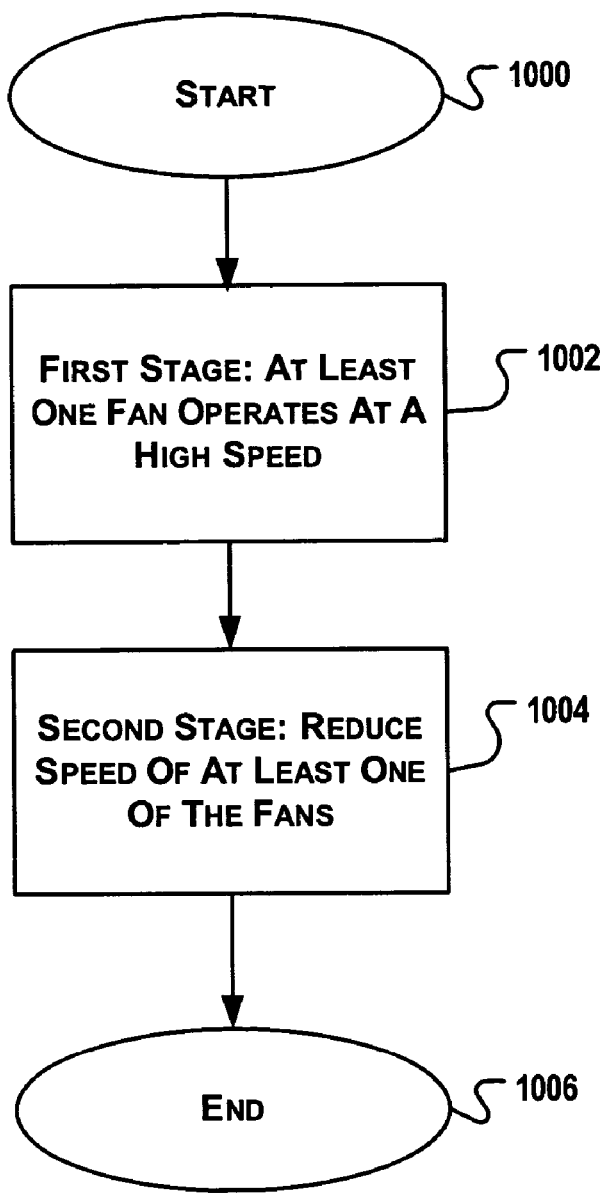
FIG. 10 is a flowchart illustrating a method in accordance with general embodiments of the invention.

FIG. 10 is a flowchart illustrating a method in accordance with general embodiments of the invention. The method begins at block 1000, and continues to block 1002 where at least one fan operates at a high speed during a first stage. For example, an impinging fan directs airflow at a first speed onto a main section of a heat sink in contact with a high thermal dissipating object. At block 1004, during an intermediary stage, at least one fan reduces its speed. In embodiments of the invention, the speed can be reduced partially or completely shut off. The method ends at block 1006.

Figure 11:
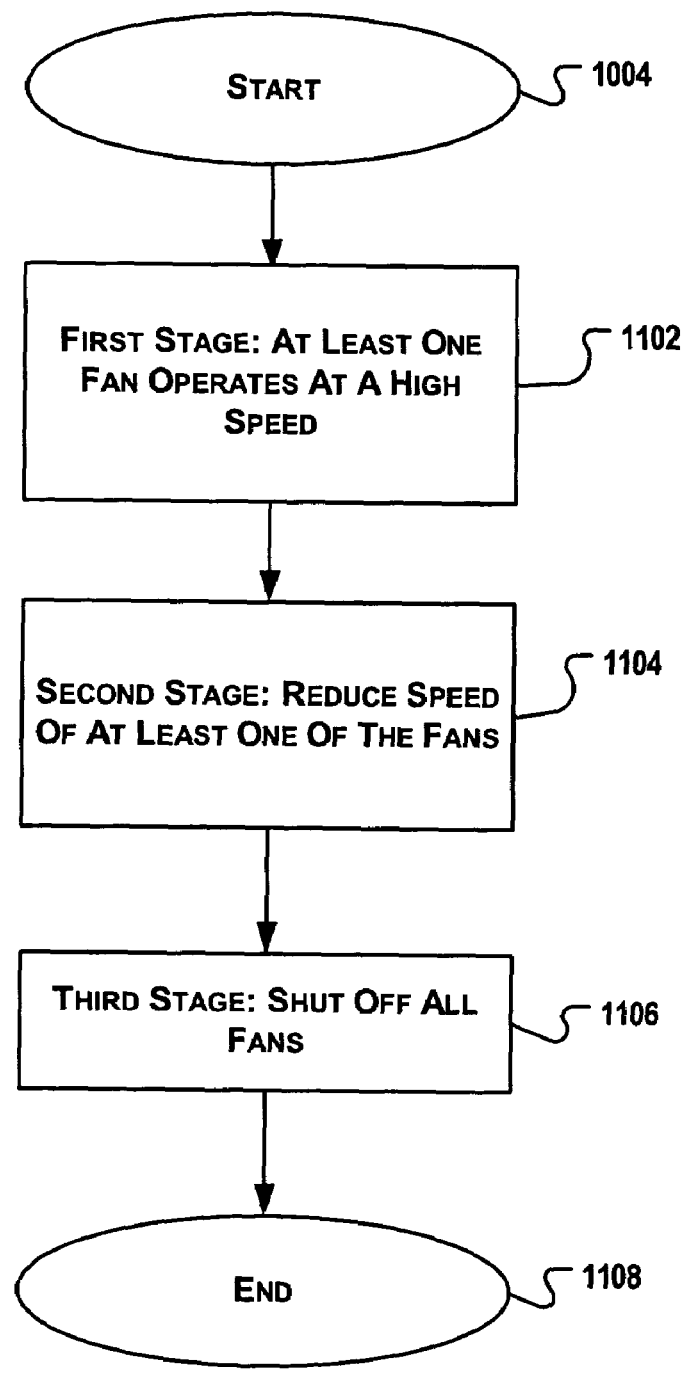
FIG. 11 is a flowchart illustrating a method in accordance with a first embodiment of the invention.

FIG. 11 is a flowchart illustrating a method in accordance with one embodiment of the invention in which the method of FIG. 11 may enter a final stage. The method begins at block 1004, and continues to block 1102 where at least one fan operates at a high speed during a first stage. At block 1104, during an intermediary stage, at least one fan reduces its speed. At block 1106, during a final stage, all fans are shut off, allowing natural convection to take place. The method ends at block 1108.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while embodiments have been described with respect to cooling a CPU in a computer system, it should be apparent from described embodiments that the concepts depicted in embodiments of the invention have general applicability. For example, in a computer system, embodiments of the invention may be applied to graphics cards, and memories. Embodiments of the invention may also be used in other applications such as is used in mobile systems, server systems, or power subsystems.

Furthermore, while described embodiments describe three stages in the system cooling process, one of ordinary skill in the art would understand that the described stages allow for other intervening sub-stages. For example, after the first stage, substages may be introduced wherein other fans are powered on. Additionally, one of ordinary skill in the art would understand that the stages are repeatable. For example, once the final stage is reached, the first stage may be reentered without departing from the spirit of embodiments of the invention. As another example, while described and illustrated embodiments refer to heat sinks having fins and sections, it is possible that one or both of these features may be omitted without departing from the scope and spirit of the invention.

As another example, the stages described herein should be used as guidelines, and not be interpreted as strict phases within which only the described events may occur. Generally, a stage describes a logical transition from one event or set of events to another event or set of events.

What is claimed is:

1. A system comprising:
   an object having high thermal dissipating properties (high thermal dissipating object);
   a first sensor communicatively coupled to the high thermal dissipating object to sense a temperature of the high thermal dissipating object;
   at least one second sensor communicatively coupled to the system to sense an air temperature of the system, wherein one of the at least one second sensors is located in close proximity to a first fan, and a second one of the at least one second sensors is located in close proximity to a second fan;
   a heat sink in adjacent contact with the high thermal dissipating object, the heat sink having a main section located nearest the high thermal dissipating object, and an extended section farthest from the high thermal dissipating object;
   the first fan to direct airflow towards the main section of the heat sink;
   the second fan to direct airflow towards the extended section of the heat sink; and
   a memory to store a computer program to receive temperature data from the first sensor and the at least one second sensor, and to vary the speeds of the first fan and the second fan based on the received temperature data.

2. The system of claim 1, wherein the first fan is co-planar with the second fan.

3. The system of claim 1, wherein the heat sink additionally comprises fins on the main section and the extended section.

4. The system of claim 3, wherein the fins on the main section of the heat sink are denser than the fins on the extended section of the heat sink.

5. The system of claim 4, wherein the fins on the main section of the heat sink are shorter than the fins on the extended section of the heat sink.

6. The system of claim 3, wherein the fins on the main section of the heat sink are spaced about equally, and about the same size as the fins on the extended section of the heat sink.

7. A system comprising:
   an object having high thermal dissipating properties (high thermal dissipating object);
   a first sensor communicatively coupled to the high thermal dissipating object to sense a temperature of the high thermal dissipating object;
   at least one second sensor communicatively coupled to the system to sense an air temperature of the system;
   a heat sink in adjacent contact with the high thermal dissipating object, the heat sink having a main section located nearest the high thermal dissipating object, and an extended section farthest from the high thermal dissipating object, the sections having fins and being connected by a high heat conductivity material, and the fins on the extended section being twice the spacing as the fins on the main section;
   a first fan;
   a second fan; and
   a memory to store a computer program to:
     detect a first set of conditions and a second set of conditions; and
     cause the first fan and the second fan to operate in accordance with the first and second set of conditions.

* * * * *